United States Patent [19]

van Steveninck et al.

[11] 4,102,145
[45] Jul. 25, 1978

[54] ANCHORING A PIPELINE TO THE GROUND

[75] Inventors: Johannes van Steveninck; Johannes R. Hogervorst, both of Rijswijk, Netherlands

[73] Assignee: Shell Oil Company, Houston, Tex.

[21] Appl. No.: 801,964

[22] Filed: May 31, 1977

[30] Foreign Application Priority Data

Jun. 3, 1976 [GB] United Kingdom ............... 22985/76

[51] Int. Cl.² ................................................ F16L 1/00
[52] U.S. Cl. ..................... 61/105; 61/53.74; 61/113
[58] Field of Search ............. 61/105, 113, 72.4, 53.74; 175/422

[56] References Cited

U.S. PATENT DOCUMENTS

| 3,763,656 | 10/1973 | Van Daalen et al. ............. 61/53.74 |
| 3,810,364 | 5/1974 | Johnson ............................ 61/105 |
| 3,852,971 | 12/1974 | Phares ........................... 61/53.74 X |

FOREIGN PATENT DOCUMENTS 628,331   10/1961   Canada .................................. 61/113

OTHER PUBLICATIONS

The Oil and Gas Journal, p. 52, Aug. 18, 1969.

*Primary Examiner*—Dennis L. Taylor

[57] ABSTRACT

The invention relates to an anchoring device and method for anchoring a pipeline to the ground, in particular to the bottom of a body of water, such as the seabed.

6 Claims, 6 Drawing Figures

ANCHORING A PIPELINE TO THE GROUND

BACKGROUND OF THE INVENTION

In streams and areas where tidal and offshore currents exist, there are significant problems with buried pipelines being washed out. Also, in the absence of weighing material in the pipeline, there is a problem with the pipeline tending to float. These and other problems are solved by the present invention as more particularly described hereinafter. Various other anchoring techniques such as described in British patent Nos. 1,335,225 and 1,333,472 do not achieve the success experienced with the present invention.

SUMMARY OF THE INVENTION

According to the invention a simple method is proposed for anchoring a pipeline to the ground, in particular to the seabed or to a beach, by means of an anchor of special design.

The method according to the invention relates to anchoring a pipeline to the ground, in particular to the bottom of a body of water, by securing an anchoring device to the ground, said anchoring device being provided with fluidization nozzles, which method comprises placing the anchoring device over the pipeline and on the ground, supplying water to the fluidization nozzles and fluidizing the ground material by passing water through the fluidization nozzles and into the ground material, allowing the anchoring device to sink into the fluidized ground material until the anchoring device has reached the desired depth, passing a fluid substance through the fluidization nozzles and into the ground material and allowing the fluid substance to solidify. Preferably the said fluid substance as used in a water/cement slurry.

A suitable embodiment of the method according to the invention comprises depositing gravel or a similar non-cohesive material on the ground and adjacent to the anchoring device, prior to the introduction of the fluid substance into the ground material, and allowing the gravel or similar non-cohesive material to sink into the ground material when it is fluidized by the fluid substance.

A suitable anchoring device for use in the above-mentioned method comprises a substantially U-shaped element, wherein the ends of the legs of the U-shaped element are provided with fluidization nozzles.

DESCRIPTION OF PREFERRED EMBODIMENTS

Figure 1:
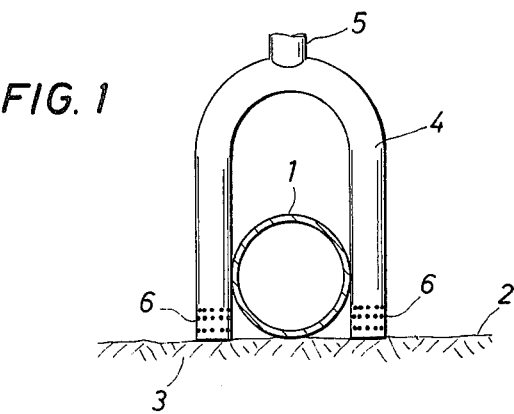
FIGS. 1 through 3 show various steps of the anchoring method, wherein the pipeline is laying on the top surface of the ground.
Figure 4:
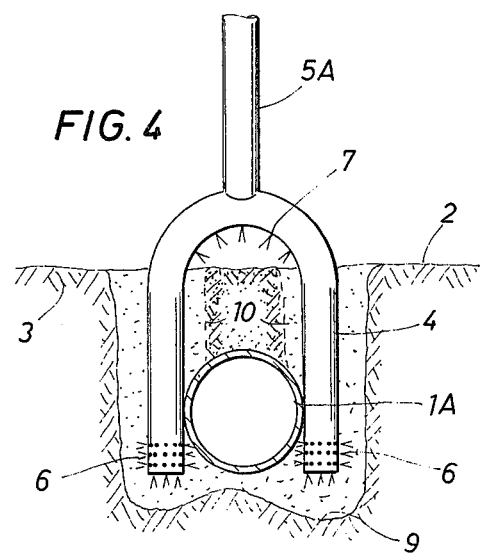
FIGS. 4 through 5 show various steps of the anchoring method, wherein the pipeline is buried in the ground.
Figure 2:
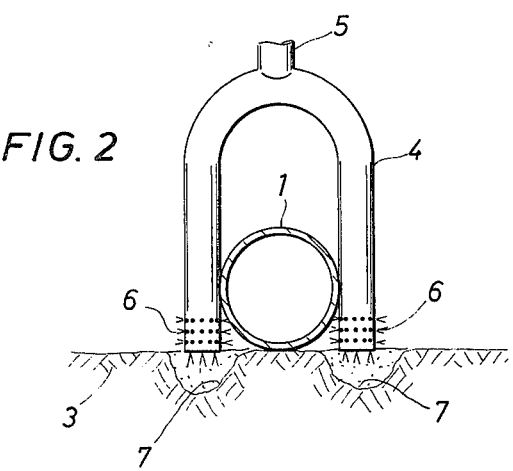
Figure 5:
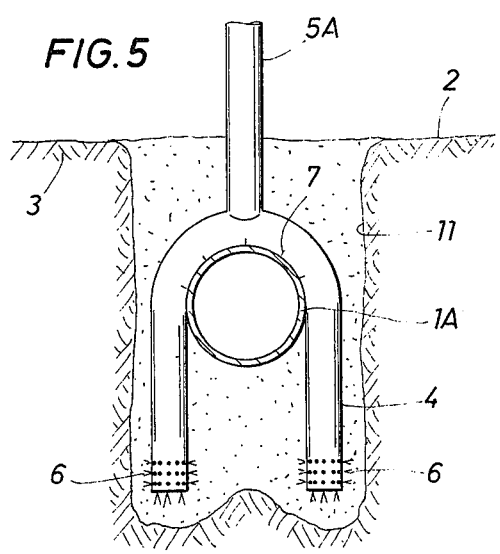
Figure 3:
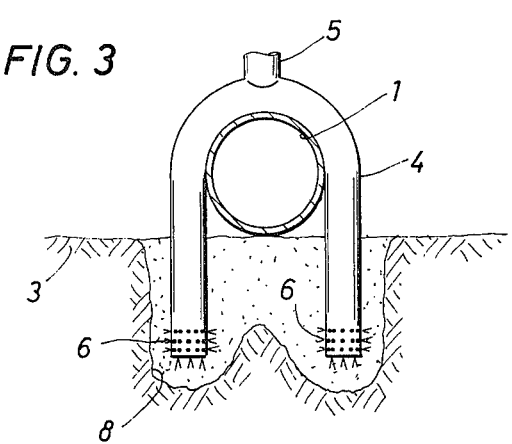

FIGS. 1 through 3 show the application of the method to the anchoring of a pipeline 1 laying on the surface 2 of the seabed 3 and FIGS. 4 and 5 show the application of the method to a pipeline 1A buried in the seabed 3.

The seabed 3 consists of a non-cohesive material, such as, for example, sand, soft clay, mud or a mixture of sand and clay, so that fluidization of the bottom material can be obtained by injecting water into the bottom material at low velocity. Fluidized bottom material behaves like a dense liquid, so that objects can be sunk into the fluidized bottom material.

The anchor 4, which is a tube bent in the form of a "u," is provided with a liquid inlet 5 and with fluidization nozzles 6. The anchor 4 as shown in FIGS. 4 and 5 is provided moreover with extra fluidization nozzles 7 and with a liquid inlet 5A of relatively great length.

In order to anchor the pipeline 1, the anchor is lowered to the seabed, for example by means of a cable, so that it is placed over the pipeline 1 in the position as shown in FIG. 1. Then water is supplied to the inlet 5, for example through a hose. The water leaves the anchor 4 at low velocity through the fluidization openings 6 which causes fluidization of the bottom material in the area enclosed by the dotted lines 7 as shown in FIG. 2.

The anchor 4 sinks into the fluidized bottom material until it has reached the position as shown in FIG. 3. In FIG. 3 the fluidized area is enclosed by the dotted line 8. Then the supply of water is stopped and instead a solidifiable fluid substance such as a water/cement slurry is supplied to the inlet 5. The water/cement slurry is passed through the nozzles 6 and is injected into the bottom material so that, in the area enclosed by the dotted line 8, the bottom material is fluidized by the water/cement slurry. Finally, the mixture of the bottom material and the water/cement slurry is allowed to harden. The result is that a block of concrete is formed and that the pipeline 1 is supported on said block of concrete and is held in position by the anchor 4, which is firmly fixed to the block of concrete.

In the case of the buried pipeline 1A as shown in FIGS. 4 and 5, the method is basically the same as the method as described with reference to FIGS. 1 through 3. Water is supplied via the inlet 5A and is allowed to pass at low speed through the fluidization openings 6. This causes fluidization of the bottom material within the area enclosed by the dotted lines 9 and 10 as shown in FIG. 4.

Because of the fluidization of the bottom material the anchor 4 sinks into the seabed 3 until the position is reached as shown in FIG. 4. In this position the water leaving the fluidization nozzles 7 starts to fluidize the bottom material between the dotted lines 10 which enables the anchor to sink further into the seabed until the anchor 4 has finally reached the position as shown in FIG. 5.

The area enclosed by the dotted line 11 is then in fluidized condition. Then the supply of water is stopped and instead a water/cement slurry is supplied to the inlet 5A. The water/cement slurry is passed through the nozzles 6 and 7 and is injected into the bottom material so that in the area enclosed by the dotted line 11, the bottom material is fluidized by the water/cement slurry. Finally, the mixture of the bottom material and the water/cement slurry is allowed to harden so that a block of concrete is formed within the area enclosed by the dotted line 11. After stopping the supply of water, it is possible to wait for some time before starting the supply of the water/cement slurry. The result is that re-sedimentation of the bottom material will occur. After the re-sedimentation of the bottom material, gravel or a similar material may be deposited on the re-sedimented seabed. The gravel will sink into the seabed, when the seabed is fluidized again by the injection of the water/cement slurry. After hardening of the mixture the gravel will form part of the block of concrete.

Figure 6:
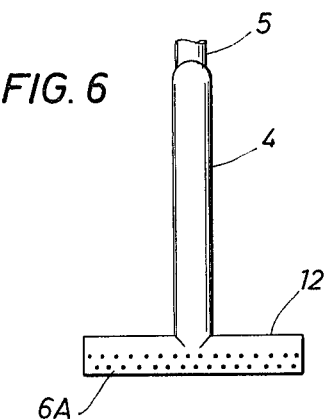
FIG. 6 shows a modified embodiment of the anchoring device.

In FIG. 6 a side view is shown of a modified embodiment of the anchor. In this embodiment the lower end of each leg of the anchor is provided with a tubular element 12. Fluidization nozzles 6A are arranged in this tubular element instead of in the lower parts of the legs of the anchor.

Instead of a water/cement slurry other solidifiable fluid substances can be used such as, for example, a suitable epoxy resin, water-glass etc. Furthermore, the anchoring method as described is suitable for use on beaches as well.

What we claim is:

1. A method of anchoring a pipeline by securing an anchoring device to the ground, said anchoring device being provided with fluidization nozzles, comprising placing the anchoring device over the pipeline and on the ground, supplying water to the fluidization nozzles and fluidizing the ground material by passing water through the fluidization nozzles and into the ground material, allowing the anchoring device to sink into the fluidized ground material and anchor the pipeline, at least some of the ground material remaining in contact with the anchoring device, passing a fluid substance through the fluidization nozzles and into the interstices of the ground material about the anchoring device and allowing the fluid substance to solidity and secure the anchoring device to the ground.

2. The method as claimed in claim 1, wherein the fluid substance is a water/cement slurry.

3. The method as claimed in claim 2, comprising depositing gravel or a similar non-cohesive material on the ground and adjacent to the anchoring device, prior to the introduction of the fluid substance into the ground material, and allowing the gravel or similar non-cohesive material to sink into the ground material when it is fluidized by the fluid substance.

4. The method as claimed in claim 3, wherein the ground material comprises sand, soft clay, mud or a mixture of sand and clay.

5. The method as claimed in claim 4, wherein the anchoring device is substantially U-shaped and fluidization nozzles are arranged at the lower part of each leg of the U-shaped anchoring device.

6. The method of claim 1 wherein both the anchoring device and the pipeline are allowed to sink into the fluidized ground material and the fluid substance is injected about the pipeline and the anchoring device.

* * * * *